United States Patent [19]

Gartner

[11] Patent Number: 4,899,382
[45] Date of Patent: Feb. 6, 1990

[54] TELEPHONE CIRCUIT USING DC BLOCKED TRANSFORMER AND NEGATIVE IMPEDANCE TECHNIQUE

[75] Inventor: Todd H. Gartner, Phoenix, Ariz.

[73] Assignee: Siemens Transmission Systems, Inc., Phoenix, Ariz.

[21] Appl. No.: 207,607

[22] Filed: Jun. 15, 1988

[51] Int. Cl.$^4$ .............................................. H04M 9/00
[52] U.S. Cl. ..................................... 379/413; 379/324; 379/398; 379/404
[58] Field of Search ............... 379/402, 403, 404, 399, 379/398, 344, 345, 413, 324

[56] References Cited

U.S. PATENT DOCUMENTS

| | | | |
|---|---|---|---|
| 3,993,880 | 11/1976 | O'Neill | 379/413 X |
| 4,241,239 | 12/1980 | Pernyeszi | 179/70 |
| 4,254,305 | 3/1981 | Treiber | 179/16 |
| 4,317,963 | 3/1982 | Chea, Jr. | 179/77 |
| 4,351,066 | 9/1982 | Treiber | 375/12 |
| 4,387,273 | 6/1983 | Chea, Jr. | 179/16 |
| 4,503,289 | 3/1985 | Spires | 379/345 |
| 4,767,980 | 8/1988 | Chen et al. | 379/413 X |

OTHER PUBLICATIONS

Bell Communications Research, Specification TR-T-SY-000303, Issue 1, Sep. 1986; pp. 3-1 to 3-10.
IEEE Journal of Solid-State Circuits, vol. SC-16, No. 4, Aug. 1981, "A High Voltage IC for a Transformerless Trunk and Subscriber Line Interface"; pp. 261-265.

*Primary Examiner*—James L. Dwyer
*Attorney, Agent, or Firm*—Jeffrey P. Morris

[57] ABSTRACT

The invention provides a combination in a SLIC for telecommunication applications of ac impedance synthesis, e.g. raising the impedance of battery feed resistances by feedback techniques; in combination with real battery feed resistors and a dc block transformer. A dc blocked transformer is coupled to line current feed resistors and a feedback loop network to synthesize the desired input impedance, such that the feedback network incorporates both positive and negative feedback. A loop stabilizing resistor is used in shunt with the dc blocked transformer secondary to reduce gain peaking and phase shift. The transformer is an integral part of the feedback loop, and one of the outputs of the solid state circuitry are directly connected to the subscriber line, thereby eliminating the problem of lightning induced transients, in that the output stages of the solid-state operational amplifier circuitry of the invention are transformer isolated from the subscriber line, and are coupled to the subscriber line through high impedances providing high resistance isolation.

16 Claims, 3 Drawing Sheets

TELEPHONE CIRCUIT USING DC BLOCKED TRANSFORMER AND NEGATIVE IMPEDANCE TECHNIQUE

BACKGROUND OF THE INVENTION

1. Field of the Invention

The present invention relates generally to telephone subscriber line interface circuits (SLIC's) for telecommunication transmission, data communication and telephone switching system applications. More specifically, the present invention relates to a SLIC circuit that is cost efficient, manufactuable in a small size, and capable of providing direct resistive line feed impedance by means of impedance synthesis, while also using a dc blocked transformer, resulting in improved line circuit transient protection, including protection of the line circuit solid state components from lightning.

2. Description of the Prior Art

As is well known, telephone line circuits are designed to provide the BORSHT functions (battery feed, overvoltage protection, ringing, signalling, hybrid and timing). Known methods of interfacing telephone subscriber lines to the local or central office switching equipment include transformer coupling with a split primary winding and some form of balanced resistors for current feeding to all solid state direct coupled circuits. The more stringent the circuit specifications, the more costly and complex such SLIC circuits have become. For example, for central office and integrated digital loop carrier (IDLC) applications, known line circuits must provide good longitudinal balance, longitudinal current capability for peak currents that can cause instantaneous reversal of the loop current direction, while also maintaining both transmission quality and the capability to transmit and receive voice band signals in the "on-hook" state. While these requirements are by way of example only, they illustrate that line circuits must be rugged and able to survive lightning induced voltage surges up to 1000 volts.

The Bell Communications Research specifications, in pertinent part, for IDLC may be found with reference to Bellcore Technical Reference TR-TSY-000 303, Issue 1, Sept. 1986, Revision 1, Dec. 1987. The known line circuit technique using a split primary transformer in conjunction with balanced (equal value) resistors which provide current feed to the subscriber line has sufficient limiting for short loops. The resistors and battery feed voltage source e.g. the exchange battery, are bypassed by a mid-point capacitor, which allows coupling the secondary side voice signal to the subscriber line with low loss. The above described line circuit configuration is simple, rugged and the signal processing electronics are transformer isolated against common mode voltages on the primary side. Balanced (equal) resistors allow bilateral current flow, e.g. there is no intrinsic limit to the level of 60 $H_z$ longitudinal currents that may be present on the subscriber line without degrading the voice signal. The above described known line circuits have the disadvantage of requiring bulky and heavy transformers. In view of the limitations of magnetic materials, it is not possible to build a small transformer able to carry substantial dc current (the line current). This is because the inductance of the transfomer rapidly collapses, e.g. flux saturation, in any form of high permeability, e.g. ungapped, core carrying dc current. Sufficient inductance necessary for voice transmission can be achieved in a small and inexpensive transformer if the transformer is dc blocked, e.g. only ac voice signals generate magnetic flux.

Many line circuits of the prior art use all solid state direct coupling techniques. An example of such an all solid-state line circuit is described in the IEEE Journal of Solid-State Circuits, Vol. SC-16, No. 4, Aug. 1981. Direct coupling to the line results in a higher risk of circuit failure from lightning induced transients, hence costly protective circuits have been designed to reduce this risk. Line circuits of the known prior art having small size and using all solid-state technology, e.g. integrated circuit technology, has not, to date, been achievable on a cost equivalent basis with the transformer coupled circuitry, also of the prior art.

The concepts of ac and dc impedance synthesis, i.e. the use of voltage or current feedback techniques to synthesize the ac transmission termination characteristics of a SLIC are known. For example; in U.S. Pat. No. 4,317,963, a SLIC using impedance synthesis for loop current regulation; in U.S. Pat. No. 4,387,273, wherein a solid state line circuit provides for independent control of the transverse and longitudinal impedances and for the adjustment of the equivalent termination impedance, upwardly or downwardly from a lower resistance value; in U.S. Pat. No. 4,254,305 wherein current limiting a line feed circuit is described; and in U.S. Pat. No. 4,351,060 wherein digitally synthesizing matching line terminating impedances using digital filter techniques is described. The concept of fluxbucking a line transformer in a line circuit having electronic equivalent line terminating impedances is also known in U.S. Pat. No. 4,241,239.

In accordance with the present invention, an improved SLIC circuit has been devised, which incorporates the positive aspects of magnetic and solid-state technology, e.g. the dc blocked transformer for small size and low cost and solid state circuitry for low voltage signal processing.

SUMMARY OF THE INVENTION

The invention provides a combination in a SLIC for telecommunication applications of ac impedance synthesis, e.g. raising the impedance of battery feed resistances by feedback techniques; in combination with real battery feed resistors and a dc blocked transformer. A dc blocked transformer is coupled to line current feed resistors and a feedback loop network to synthesize the desired input impedance, such that the feedback network incorporates both positive and negative feedback. A loop stabilizing resistor is used in shunt with the dc blocked transformer secondary to reduce gain peaking and phase shift. The transformer is an integral part of the feedback loop, and one of the outputs of the solid state circuitry are directly connected to the subscriber line, thereby eliminating the problem of lightning induced transients, in that the output stages of the solid-state operational amplifier circuitry of the invention are transformer isolated from the subscriber line, and are coupled to the subscriber line through high impedances providing high resistance isolation.

It is therefore a primary object of the invention to provide a small, cost effective SLIC circuit having a dc blocked transformer and ac impedance synthesis circuitry to provide the desired input impedance with solid state circuit high resistance isolation from the subscriber line.

It is another object of the invention to avoid the use of high cost power transistors and associated transient protective circuits of the prior art, as well as to avoid the use of large transformers and complex custom integrated circuitry.

It is another object of the invention to provide the solid-state portion of the SLIC of the present invention with non-precision operational amplifiers and to protect such low cost solid state circuitry from line transients either by transformer isolation or high resistance isolation.

Other objects and advantages of the invention will become apparent with reference to the accompanying drawings and detailed description thereof, wherein:

DESCRIPTION OF THE PREFERRED EMBODIMENT

Figure 1:
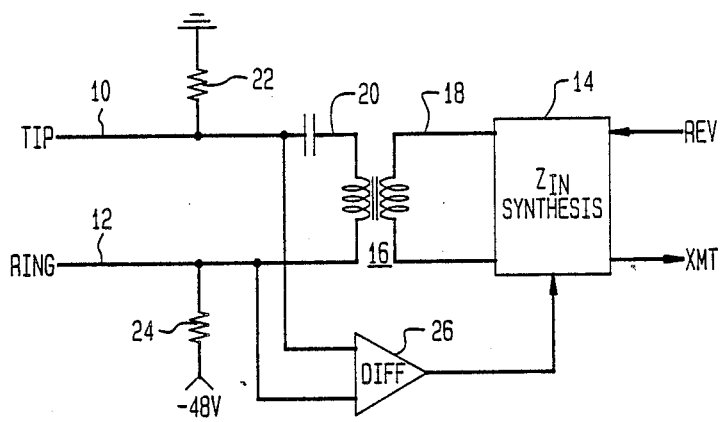
FIG. 1 is a simplified block diagram of an impedance synthesis network.

The theory of operation of the present invention will be explained with reference to FIGS. 1 to 4. FIG. 1 illustrates the sensing of voltage at the subscriber loop, the tip and ring lines 10 and 12, and the feedback of the sensed voltage to an impedance synthesis network 14 on the secondary winding side 18 of a transformer 16 having a primary winding side 20. A pair of matched resistors 22 and 24 provide line current feed, allowing the desired bilateral current flow on the tip and ring lines 10 and 12. Such line feed resistors may be implemented by thick film technology. The desired metallic (differential mode) input impedance normally specified for telephone transmission, as is well known, is that the line circuit impedance look like 900 ohms in series with a 2.16 microfarad capacitor. However, adequate current feed for long loops, e.g. a large external resistance; and sufficient current limiting at short loops, e.g., low resistance, constrain the line feed resistances 22 and 24 to about 200 ohms each. The 400 ohms input impedance is substantially below specification, hence the desired input impedance is synthesized at impedance synthesis circuit 14 by a negative resistance feedback technique. Conceptually, the impedance synthesis network 14 parallels the actual 400 ohm impedance of the line feed (also called the battery feed) resistors with a negative impedance to raise the effective impedance looking into the circuit. The sensing of the input voltage on the tip and ring lines for feedback to the impedance synthesis network 14 is shown via a differential amplifier 26.

Figure 2:
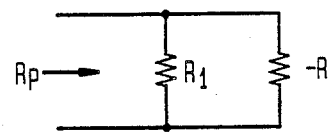
FIG. 2 illustrates the concept of paralleling resistors to raise the effective impedance.

An example of raising a 400 ohm impedance to 900 ohms will be explained with reference to FIG. 2, wherein from the formula for paralleling resistors:

$$Rp = \frac{R1 * R2}{R1 + R2} \qquad \text{Eq. (1)}$$

If one of the resistors is negative, e.g. R2 = −R, then:

$$Rp = \frac{R1 * (-R)}{R1 - R} \qquad \text{Eq. (2)}$$

If the magnitude of R is greater than the magnitude of R1, than the denominator will be negative. This is necessary so that the total expression for Rp will have a positive sign, and therefore a positive resistance will be realized. The basic formula can be rearranged as follows:

$$R = \frac{Rp * R1}{Rp - R1} \qquad \text{Eq. (3)}$$

For the case of R1=400 and Rp=900, R=720 ohms magnitude.

Figure 3:
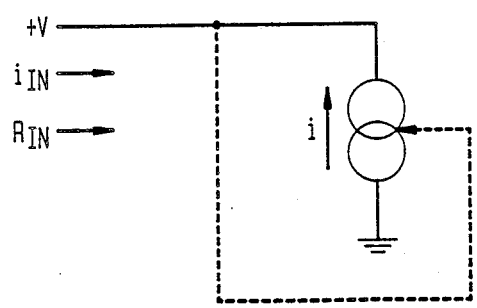
FIG. 3 illustrates an implementation of a transconductance amplifier with an operational amplifier.

A negative resistance is simply a two terminal network in which current flows out of the positive node under the influence of an externally applied positive voltage. Such a network can be realized with a transconductance amplifier e.g., a voltage controlled current source connected as illustrated in FIG. 3. The magnitude of the effective resistance is the inverse of the transconductance. Thus, $$i = gmV, \text{ and} \qquad \text{Eq. (4)}$$

$$R_{1Nin} = \frac{+V}{iIN} = \frac{+V}{-gmV} = \frac{-1}{gm} \qquad \text{Eq. (5)}$$

A realization of a transconductance amplifier via an operational amplifier is illustrated by FIG. 3.

Figure 4:
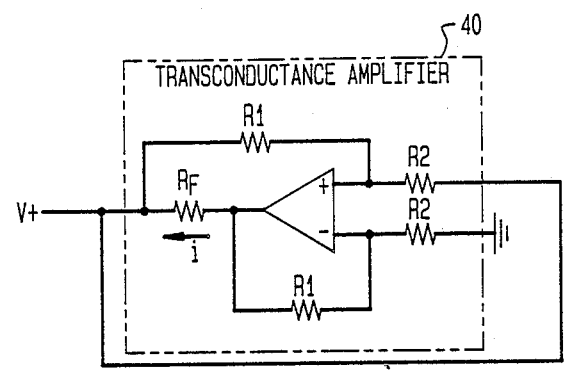
FIG. 4 illustrates a transconductance amplifier configured as a negative resistance.

FIG. 4 shows a transconductance amplifier 40 configured for negative resistance. If this network is then paralleled with a real 400 ohm resistor, a positive 900 ohms will be synthesized. For FIG. 4, $$gm = \frac{R_1}{R_2 R_f} \qquad \text{Eq. (6)}$$

In the line circuit application, only an ac impedance (frequencies above 200 $H_z$) need be synthesized. The dc resistance of 400 ohms must be maintained for good line feed current. To satisfy this requirement, the negative impedance network is coupled to the line via a transformer and a capacitor. The transformer is needed because it provides the means to couple the unbalanced (referenced to ground) voice signal driving the line to the balanced line (equal impedance to ground from each lead). The capacitor is needed because it provides the dc blocking which enables the use of a small transformer.

For a sufficiently "ideal" transformer, e.g. an inductance of several Henries and capacitor, e.g. several microfarads the elements described if configured as described will adequately synthesize 900 ohms. The definition of adequate for telephony applications is defined by the measurement called two wire (2W) return loss, which compares an unknown impedance to a reference impedance and expresses their match in decibels. The return loss has a unique value at every frequency, and a weighting curve is used over the voice band to derive three numbers as a figure of merit; these are called the Echo return loss (ERL), and Singing return loss (SRL) lo band, and hi band. The specification requires the SRL bands to equal or exceed 20 dB and the ERL band to equal or exceed 28 dB.

The above description embodies the basic concepts of the invention. The preferred embodiment requires a complex input impedance having a capacitive reactive component (2.16 μF equivalent) in addition to the 900 ohms resistive. The synthesis of this impedance proceeds in the same manner as for a pure resistance, except that the feedback must incorporate a frequency dependent network. In a practical circuit, with finite values of transformer inductance and blocking capacitance, and the effect of a shunt resistor, the actual R & C values must be altered to achieve a compromise of return loss and loop stability.

Figure 5:
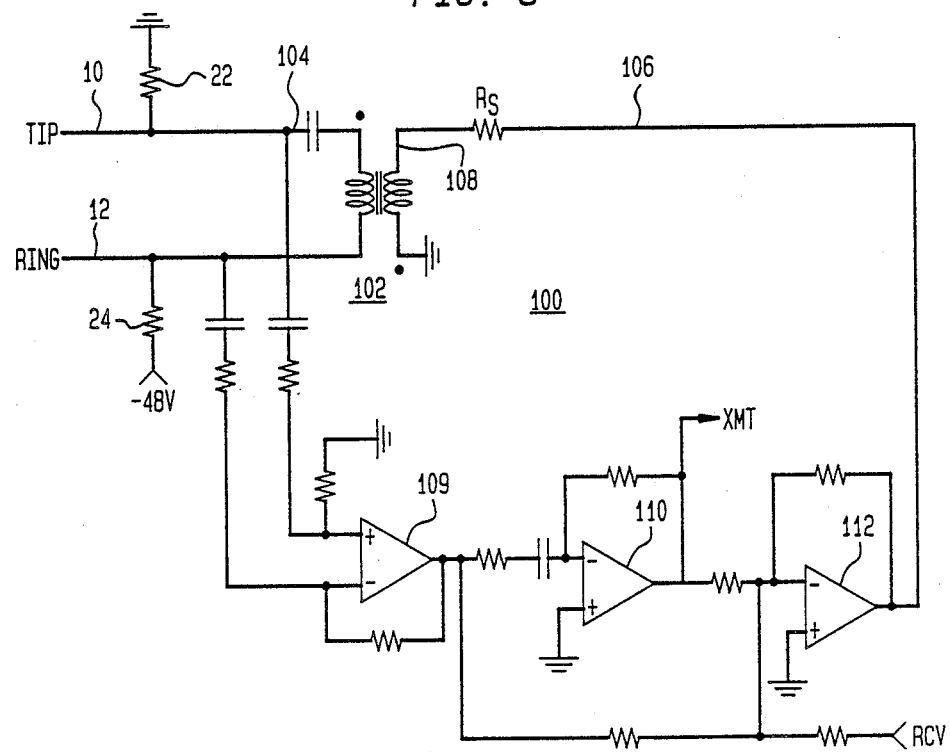
FIG. 5 illustrates a preferred embodiment of the invention implementing a synthesized ac input impedance and a dc blocking transformer.

Referring now to FIG. 5, an input impedance synthesis circuit is shown generally at 100. A Thevenin-Norton transformation has been used to convert the combination of a transconductance amplifier and shunt resistor Rs to a series resistor Rs driven from voltage output of 112. Since feedback is used, both positive and negative, in the synthesis loop, the classical problem of feedback loop stability exists. Loop stability requires that if the loop is open circuited at some point so that a driving signal can be inserted and response around loop measured, then the loop gain must be less than unity at a total loop phase shift of 360 degrees. A common measure of loop stability is phase margin, which is the additional phase shift required at unity gain to just equal 360 degrees.

For practical values of transformer 102 inductance, e.g., 4 henries, and coupling capacitance Cc (3 μF) at 104, a resonance occurs at low frequencies (approximately 100 Hertz). This resonance causes sharp gain peaking and strong phase shift in the natural transformer/load circuit, which can easily lead to loop oscillation. To alleviate the gain peaking and also moderate phase shift, a resistor Rs at 106 is applied in series with in the transformer 102 secondary winding 108. This can be thought of as a means to lower circuit Q. Series resistance may be Rs 1000 ohms, although the exact value is not critical. A loop phase margin of 18 degrees is desirable.

The tip and ring lines 10 and 12 are dc blocked by transformer 102. Line feed is provided through resistors 22 and 24, and a feedback loop through operational amplifiers 109, 110 and 112 achieves the aforementioned loop stability, with the transmit and receive signals at lines 114 and 116 respectively to the 2/4 wire hybrid, described with reference to FIG. 6 circuit provided as shown.

Figure 6:
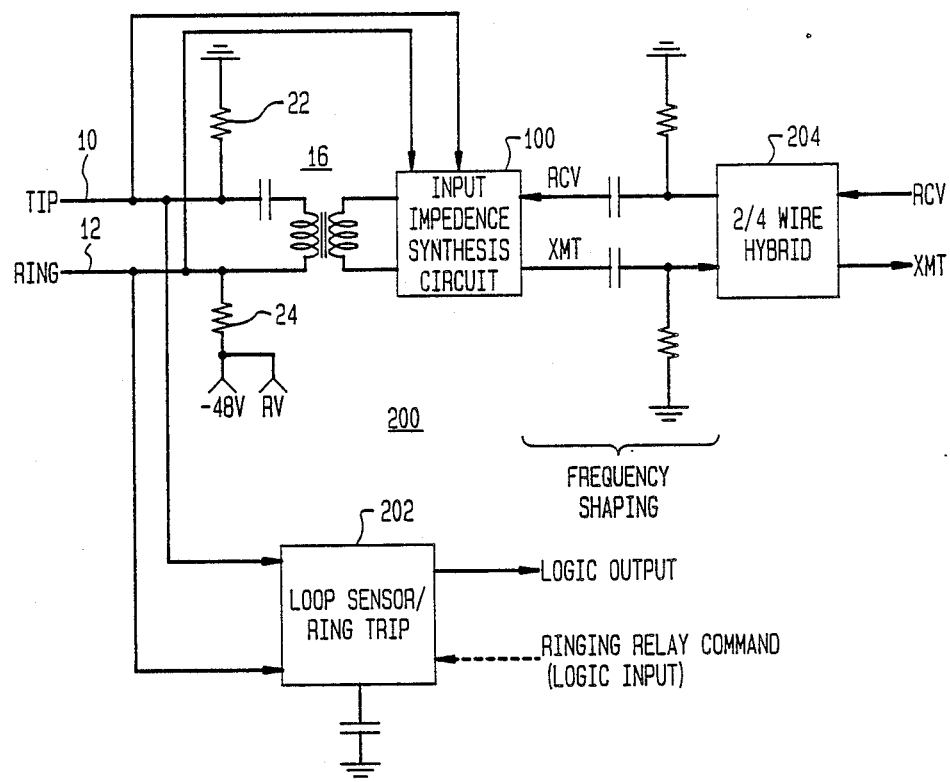
FIG. 6 illustrates a line circuit incorporating the present invention.

Referring now to FIG. 6, a line circuit incorporating the invention is shown generally at 200, wherein the input impedance synthesis circuit 100 is configured with the isolation transformer 16, loop status detection circuitry 102 (on/off hook), ring trip detection 202 two-to-four wire hybrid 204, and the remainder of the circuitry for implementing the BORSHT functions.

Transients on the subscriber line coupled to the aforementioned circuitry via tip and ring lines 10 and 12 are blocked at transformer 16, and circuit 100 provides the necessary input impedance adjustment through the described feedback loop to enable the use of low ohmic value line feed resistors 22 and 24 and non-precise operational amplifiers in the loop such that the overall line circuit of FIG. 6 in both low cost, due to its use of non-custom IC's and a small core transformer, and effective to implement the necessary telephone functions of a line circuit.

While the present invention has been described in connection with a preferred embodiment thereof, it is to be understood that additional embodiments, modifications and applications which will become apparent to those skilled in the art are included within the spirit and scope of the invention as set forth by the claims appended hereto.

I claim:

1. In a telephone subscriber line circuit for providing line current to one or more subscriber lines from a source of dc battery voltage, the improvement comprising:
   line feed resistance means for coupling said battery voltage to said subscriber line;
   ac input impedance synthesis circuit means, including means for sensing the voltage on said subscriber line, and a feedback loop responsive to said sensed voltage such that an effective negative impedance is provided in parallel with said line feed resistance to raise the effective input impedance of said line circuit to a value higher than the value of said line feed resistance means; and
   a dc blocked transformer having a primary winding coupled to said line feed resistance means and a secondary winding coupled to said ac input impedance synthesis circuit to provide isolation from line transients.

2. In a telephone subscriber line circuit in accordance with claim 1, the improvement further comprising:
   dc blocking capacitor means in series with the primary winding of said transformer.

3. In a telephone subscriber line circuit in accordance with claim 1, wherein said line feed resistance means comprise a pair of matched resistors of approximately 200 ohms each, and which resistors are each directly connected respectively to the tip and ring lines of said subscriber line.

4. In a telephone subscriber line circuit in accordance with claim 1, wherein said ac input impedance circuit is comprised of all solid state circuitry.

5. In a telephone subscriber line circuit in accordance with claim 1, wherein said negative impedance includes a transconductance amplifier means for providing a voltage controlled current source, said transconductance amplifier being comprised of one or more operational amplifiers configured to provide a path for said sensed voltage back to the secondary winding of said transformer.

6. In a telephone subscriber line circuit in accordance with claim 1, the improvement further comprising:
   shunt resistance means coupled to said secondary winding of said transformer to reduce gain peaking and phase shift in said feedback loop.

7. In a telephone subscriber line circuit in accordance with claim 6, the improvement further comprising said transformer being configured as an integral part of said feedback loop.

8. In a telephone subscriber line circuit in accordance with claim 7, wherein said feedback loop provides both negative and positive feedback.

9. In a telephone subscriber line circuit in accordance with claim 3, wherein said matched line feed resistors are implemented in thick film technology.

10. In a telephone subscriber line circuit in accordance with claim 1, further comprising:
   means for coupling ac voice signals to and from said input impedance synthesis circuit; and
   high impedance means for providing isolation of said ac voice signals from said subscriber line.

11. A telephone subscriber line circuit for providing line current to a telephone subscriber line from a source of dc battery voltage, comprising:
- line feed resistance means for coupling said battery voltage to said subscriber line;
- ac input impedance synthesis circuit means for sensing the voltage on said subscriber line; and including negative feedback loop means responsive to said sensed voltage to derive a negative impedance in parallel with said line feed resistance to raise the effective value of said input impedance to a value higher than the actual value of said line feed resistance means;
- dc blocked transformer means having a primary winding coupled to said line feed resistance means and a secondary winding coupled to said ac input impedance circuit to provide isolation from transient voltages on said subscriber line.

12. A telephone subscriber line circuit in accordance with claim 11 further including:
- means for coupling ac voice signals bidirectionally to said ac impedance synthesis circuit, such that said ac voice signals are electrically isolated by high impedance means from said subscriber line.

13. A telephone line circuit in accordance with claim 12 further including:
- two-to-four wire conversion means for coupling said bidirectional ac voice signals to said ac impedance synthesis circuit.

14. A telephone line circuit in accordance with claim 12 further including:
- a dc blocking capacitor in series with the primary winding of said transformer.

15. A telephone line circuit in accordance with claim 13 wherein said negative impedance loop includes transconductance amplifier means configured from one or more series connected solid state operational amplifiers.

16. A telephone line circuit in accordance with claim 14 further including:
- ring trip sensing means coupled to the primary winding of said transformer means.

* * * * *